Figure 1:
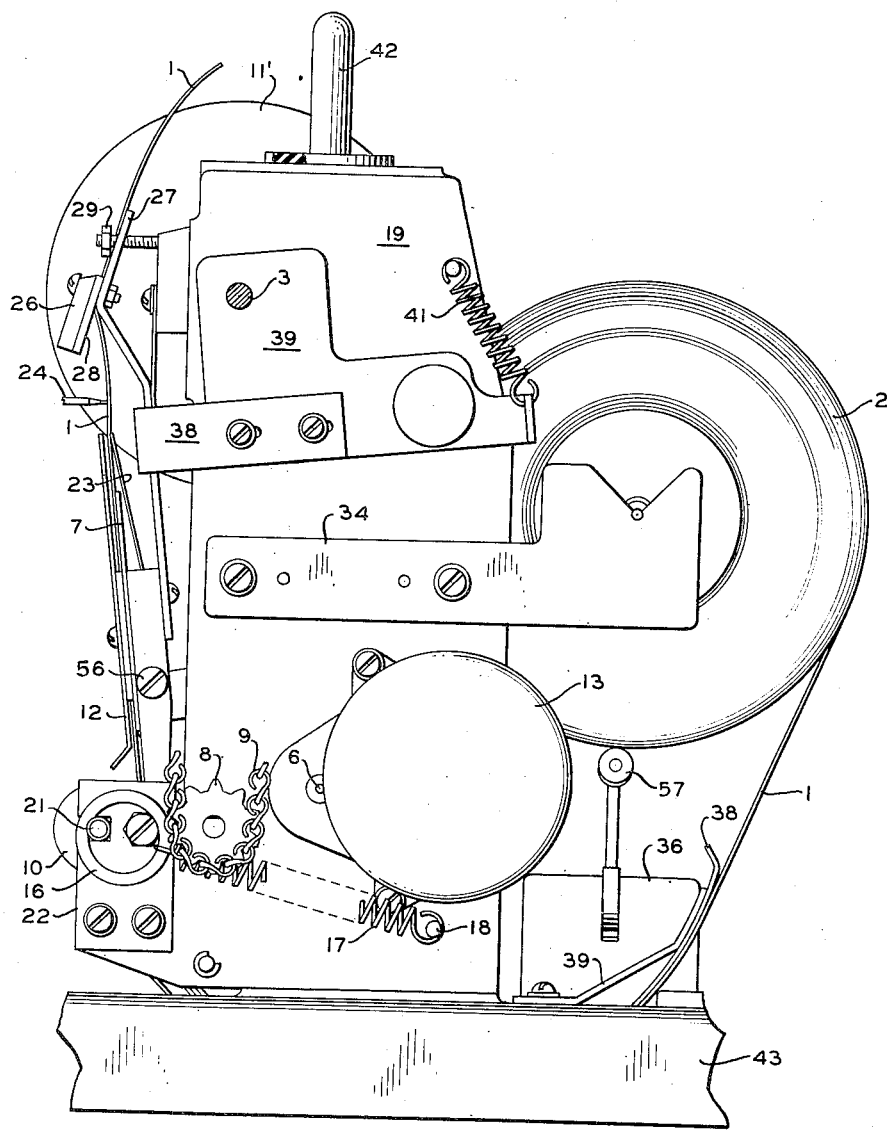

Oct. 9, 1956

C. B. ROUNTREE 2,766,096

PLATEN

Filed May 8, 1953

5 Sheets-Sheet 2

INVENTOR.
C. B. ROUNTREE
BY
M. J. Reynolds
ATTORNEY

Oct. 9, 1956

C. B. ROUNTREE 2,766,096

PLATEN

Filed May 8, 1953

5 Sheets-Sheet 3

INVENTOR.
C. B. ROUNTREE
BY
M. J. Reynolds
ATTORNEY

Oct. 9, 1956
C. B. ROUNTREE
2,766,096
PLATEN
Filed May 8, 1953
5 Sheets-Sheet 4
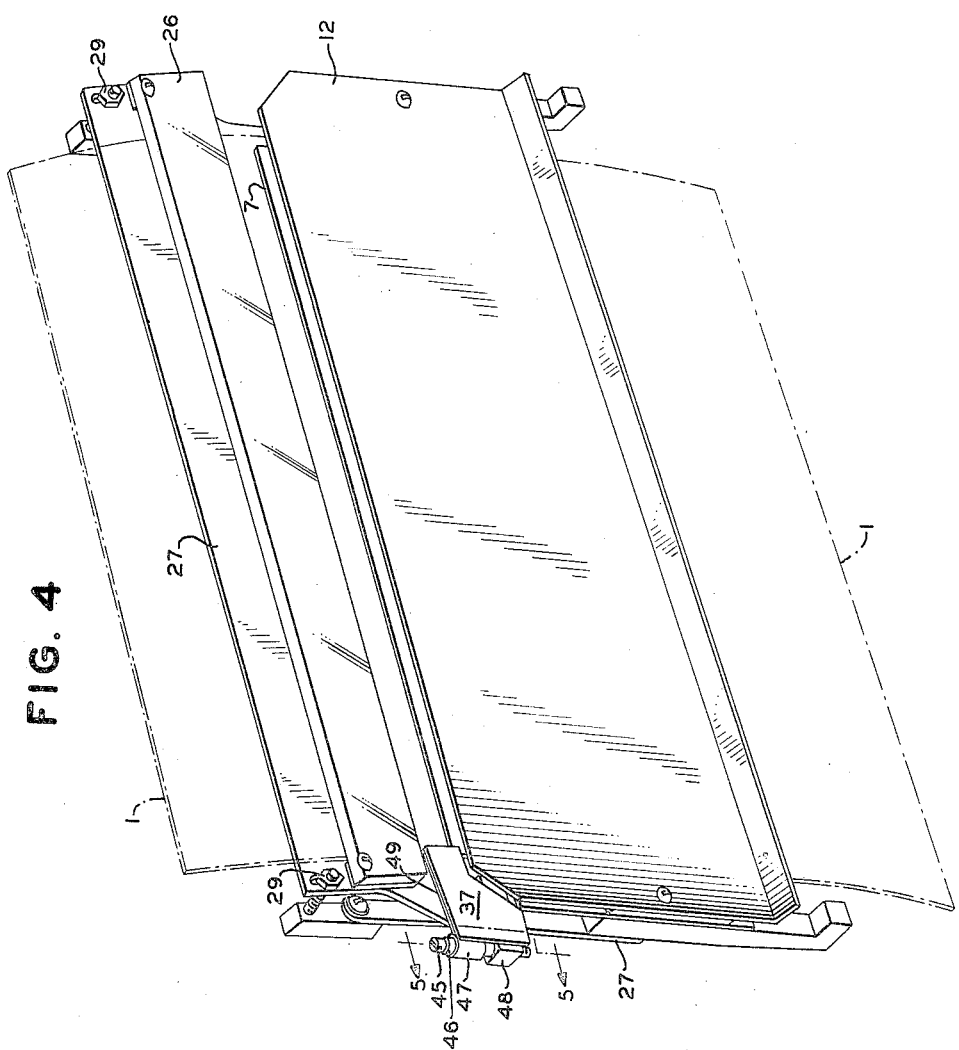
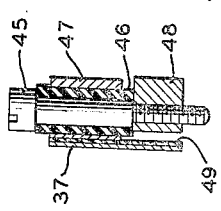
INVENTOR.
C. B. ROUNTREE
BY
M. J. Reynolds
ATTORNEY Oct. 9, 1956  C. B. ROUNTREE  2,766,096
PLATEN
Filed May 8, 1953  5 Sheets-Sheet 5

INVENTOR.
C. B. ROUNTREE
BY
M. J. Reynolds
ATTORNEY

United States Patent Office 2,766,096

Patented Oct. 9, 1956

2,766,096

PLATEN

Calvin B. Rountree, Tappan, N. Y., assignor to The Western Union Telegraph Company, New York, N. Y., a corporation of New York Application May 8, 1953, Serial No. 353,794

8 Claims. (Cl. 346—136)

This invention relates to improvements in the record blank control mechanism of facsimile reproducing devices, and more particularly to an improved platen for high speed recorders of the type described in application Ser. No. 279,261, filed March 29, 1952, although it is also suitable for application to other types of page recorders. The arrangement of the present invention is especially adapted to those recorders which are subjected to vibration and shock during service, as for instance, in mobile applications, and is well adapted also to those cases where operation of the recorder by unskilled or nontechnical personnel is contemplated.

Page recorders of the continuous sheet type previously used have been of the kind employing a platen which is spring pressed against a fixed stop and against which the recording paper is pressed by a stylus in its sweep path across the paper. In addition to the pressure of the stylus itself, it is sometimes advantageous to apply further pressure to the paper by means of a helical spring lying across the surface of the paper, as is done in the aforementioned application for facsimile recorder. As described in that application, the platen consists of a solid bar sufficiently thick to be inflexible under these forces, which extends across the front of the recorder. Because of the large amount of inertial reaction which arises when any attempt is made to move such a platen rapidly, it is made of a light material, preferably of magnesium.

Despite the important improvement over the prior art made thereby, which contributed to the approximately tenfold increase in speed of operation effected by the arrangement of the above-mentioned application, certain disadvantages still remained both in the arrangement described in said application, and especially in the prior art which it superseded. These disadvantages were due first to the fact that the platen in question, since it was required to be both large and strong, was necesarily more heavy than would be desirable from the standpoint of economy and portability regardless of any practical material that might be used in its construction. Secondly, during a portion of the operating cycle of a high speed facsimile receiver, namely, during the time in which the paper is advanced rapidly after conclusion of the receipt of a message or the like, for the purpose of providing a suitable margin beneath the text before cutting off the paper, the platen is required to be withdrawn rearward from the paper. This is done very rapidly, and the large accelerational forces developed add further to the required strength, and therefore to the weight of the platen, as well as requiring a more powerful actuating source for the movement of the heavier platen.

In consequence of this relatively large force required to move the platen, it does not yield quickly to irregularities in stylus pressure caused when the stylus traverses imperfections in the paper. On the contrary, the high speed motion of the rigidly constrained stylus can cause accelerational forces between stylus and platen sufficient to prevent the stylus from riding over paper imperfections thus causing it to catch therein, tearing the paper across.

Slower speed recorders are subject to the same difficulty due to the necessity for spring-pressing the platen against fixed stops when in the operating condition, thus making it relatively unyielding to stylus impulses.

Another disadvantage of a relatively massive platen is that vibration or shock applied to the whole machine can cause the platen to bound away from the stylus, since it is retained in position by a spring acting to hold it against a stop. Under this bouncing condition, insufficient pressure is applied to the stylus to enable it to write, and broken characters in the recorded mesage can result. Reduction of the moving mass of the platen by means of the present invention reduces the force acting to cause this difficulty in direct proportion as that mass is reduced.

Still another disadvantage encountered with the relatively massive platen currently used in high speed recorders is due to the fact that engagement of the stylus with the record paper and the application of writing pressure thereto at the beginning of each line must occur at a very rapid rate. With the stylus rigidly constrained to a predetermined path, and thus applying writing pressure to the platen in the form of a repetitive impulse, mechanical oscillation of the platen can be avoided only through careful balancing of the platen by adjustable springs, whose adjustment frequently must be changed to meet varying conditions, such as wear of the stylus.

One of the objects of the present invention is to provide a recording blank platen for continuous page recorders which does not require the use of snubber springs or critical adjustments in order to avoid inertial bounce of the platen, which results in the appearance of density striae across the recorded message.

Another object is to provide a paper holding arrangement which does not induce the moving stylus to cause tearing of the message blank and resulting paper jams when the stylus encounters imperfections in the message blank.

A further object is to provide a structure which enables the paper web to be more simply and easily threaded into the platen structure and which minimizes tearing of the message paper by the moving styli should the paper be imperfectly threaded by an operator through inadvertence.

A still further object of the invention is to secure an arrangement of components which effectively prevents tearing of the paper web by the moving styli as a consequence of external mechanical shock or vibration imposed on the recorder.

A still further object of the invention is to provide a paper feed and control structure which is insensitive to positional changes or changes in spatial attitude of the recorder.

Other objects and advantages of the invention will hereinafter appear.

Figure 2:
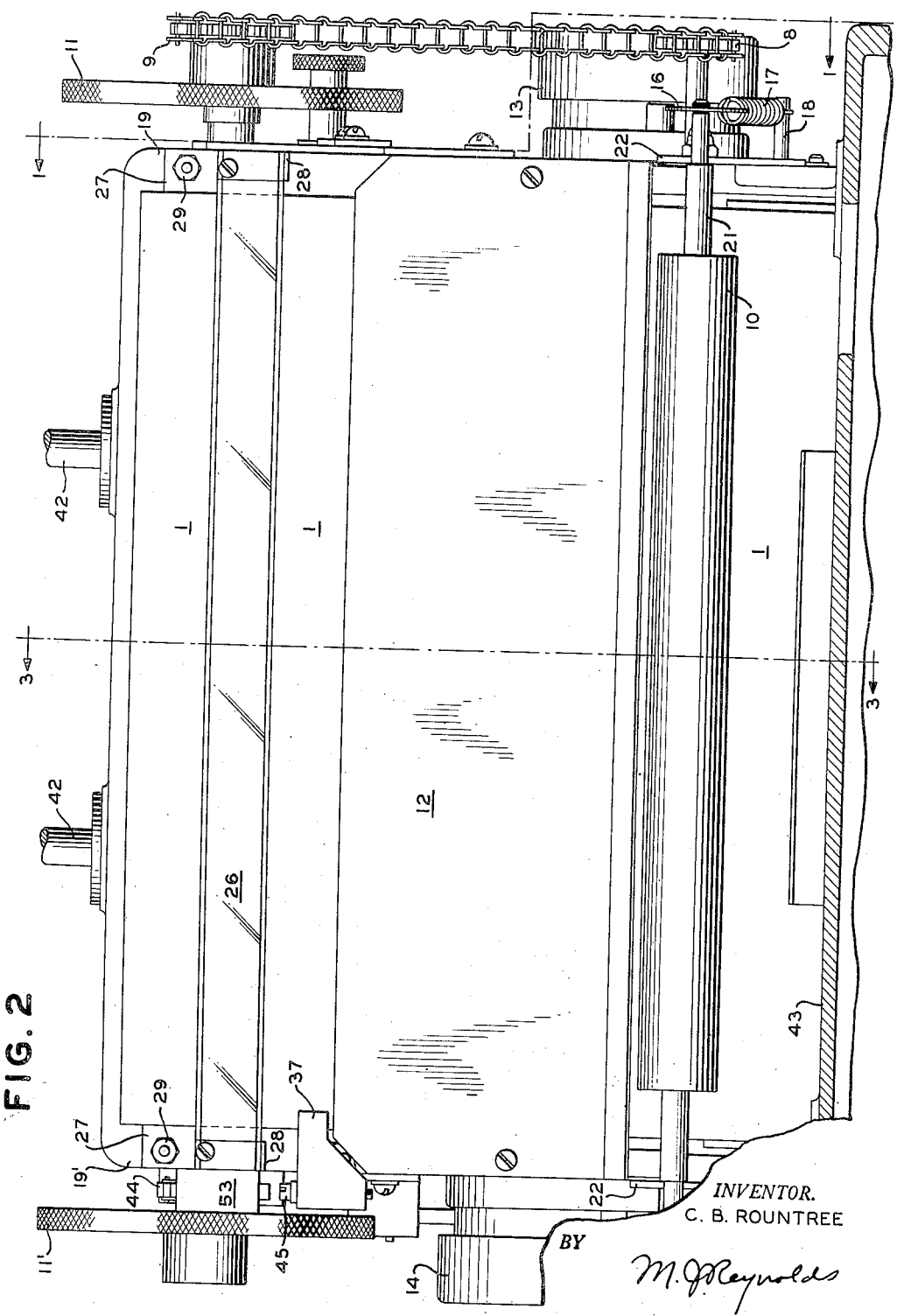
Figure 3:
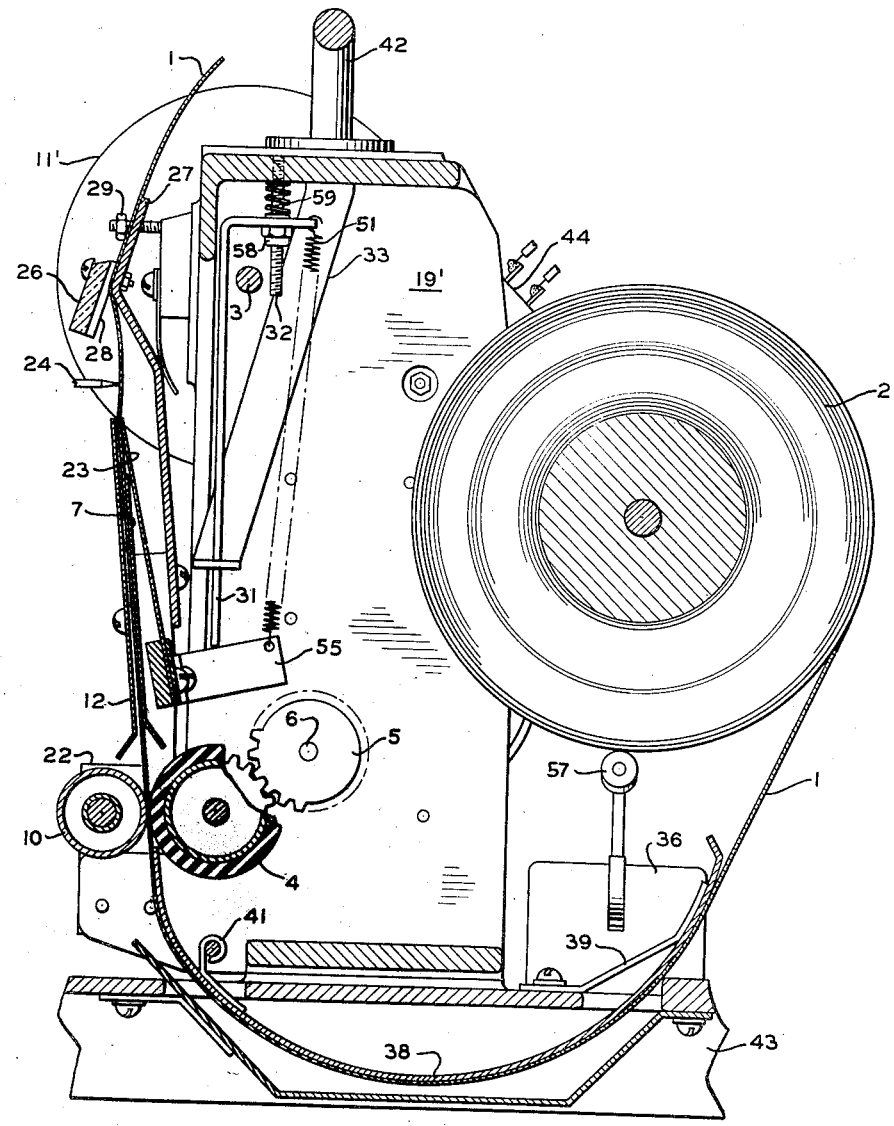
Figure 6:
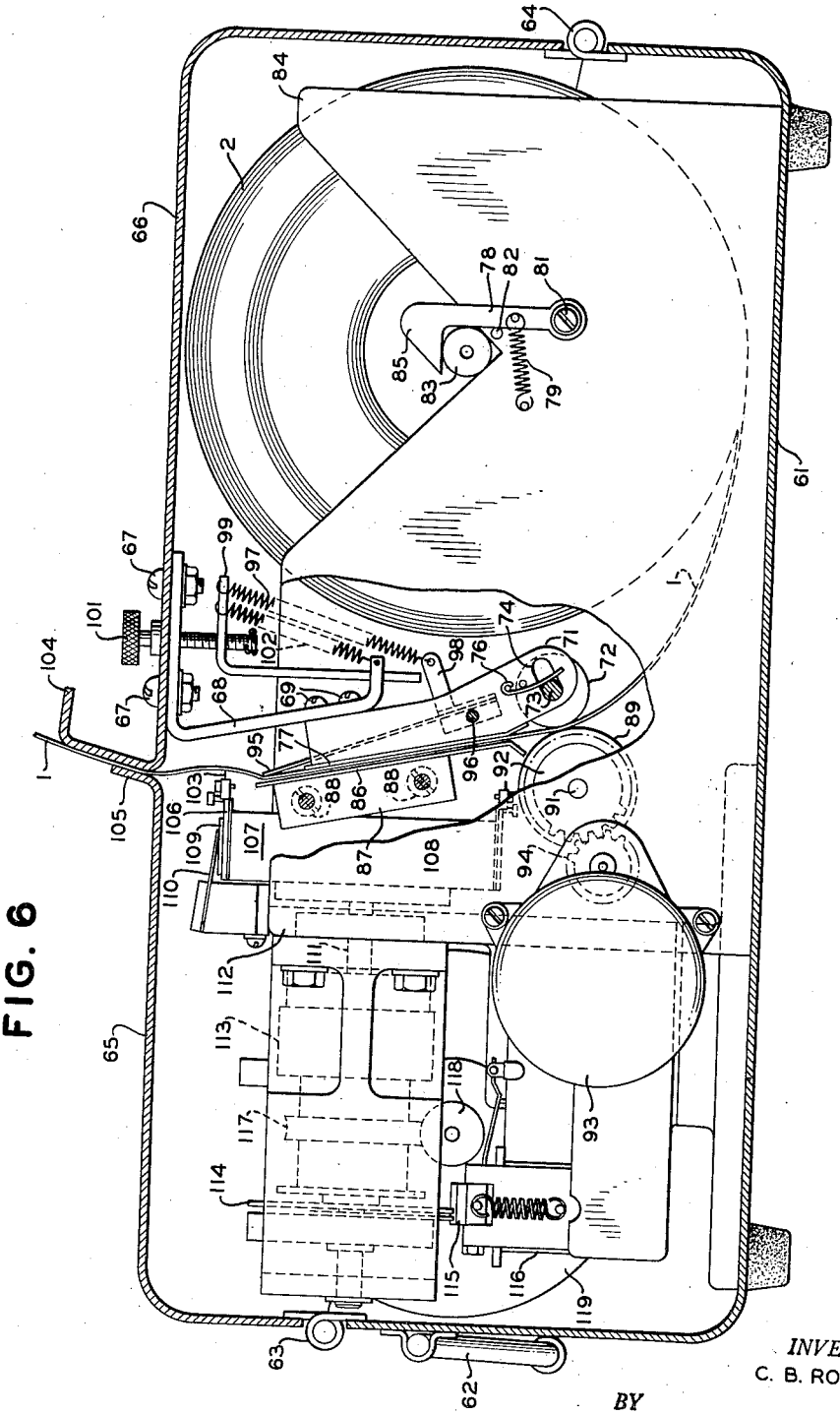

The various novel features of this invention will be more fully understood from a detailed description of the accompanying drawings, in which: Fig. 1 represents a profile view of one embodiment of the writing mechanism and associated paper feed assembly of a facsimile recorder employing the present invention; Fig. 2 represents an elevational view of such recorder employing the present invention; Fig. 3 is a cross-sectional view of the mechanism of Figs. 1 and 2 taken on the line 3—3 of Fig. 2; Fig. 4 is a cross-sectional view of another embodiment of the present invention; Fig. 5 is a cross-sectional view of the stylus skid assembly shown in Fig. 4; and Fig. 6 is a sectional view of another embodiment of the present invention.

The platen structure of the present invention is shown applied to a facsimile page recorder of the medium speed type. Briefly, this recorder comprises a stylus operating unit having an endless flexible belt on which are rigidly mounted a plurality of spaced styluses constrained to travel in a fixed and invariable scanning path. The instant platen is fixedly mounted in such relation to the scanning path that a web of recording paper fed through it from a paper supply roll intersects the scanning path at a level where the paper is unsupported from the rear. Because of the structure of the platen, the paper is flexed into pressure contact with the stylus along the scanning path by a bending action exerted on it in the platen, whereby the resilience of the paper web is employed to generate writing pressure at the point of stylus engagement. Thus the resilient contact which must always be maintained between the stylus and the recording sheet is provided by the inherent resiliency of the paper under control of its flexation by the platen. By the present invention, therefore, the platen is removed from operating dependence on the stylus, and is used primarily for paper guiding and for the production of a constant fixed writing pressure. Through this arrangement, all of the inertia, momentum, and gravitational effects of the conventional resiliently mounted platen are eliminated, and a superior uniformity of stylus contact pressure is obtained under all conditions of operation.

The facsimile recording equipment intended to be used in conjunction with the present invention comprises a stationary frame having vertical side members at the ends thereof, in which are journalled the horizontal shafts of the paper transport mechanism as later described. A roll of electrographic recording paper is mounted on a shaft so supported at the rear of the machine, and paper therefrom is fed downward and forward to emerge beneath a pair of paper feed rolls. Passing upwardly between these rolls, the paper is urged upward through the simultaneous action of a pair of synchronous motors having speed reducing gears which engage driving gears at either end of the rearward paper feed roll. A superposed paper guiding chute is affixed thereabove, comprising spaced plates which serve to definitely establish the direction of travel of the paper web as it passes unsupported across a gap in which a transversely moving stylus driven by a rotating belt operates to mark the paper with received information. Further upward motion of the paper causes it to pass beneath a transparent ruler where it emerges and can be torn off against the ruler, either at that point or after feeding out any desired additional paper as a margin by rotating one of a pair of handwheels connected to advance the paper feed rolls.

Referring now to Fig. 1, there is shown a facsimile recorder mounted on the base 43 and portable by means of the handle 42, wherein numeral 1 designates a sheet of electrosensitive recording paper fed from a roll of paper 2 which is supported on brackets 34. The feed roll 4 of Fig. 3 engages and drives roll 10 as seen more clearly in Fig. 3, to advance the paper gripped between them. Roll 4 is rotated by gears, such as 5 of Fig. 3 which are located on each of the two opposite side frames 19 and 19' of Fig. 2 and is also connected by sprocket 8 and chain 9 to the manually operated rapid feedout wheels 11 and 11' mounted in a common shaft 3 as seen in Fig. 2. Gears 5 of Fig. 3 are mounted inside of the frames 19, 19' of Fig. 2 on shafts, such as 6 which pass through the frames and are driven by motors 13 and 14 of Fig. 2.

Paper feed roll 10 is an idler roll, being urged into pressure engagement with roll 4 of Fig. 3 by the tension of springs 17 as seen in Fig. 1 acting against pins 18 in the side frames 19 and 19' to urge its axle 21 inwardly in slotted retaining plate 22, by tension applied to flat washer 16 which engages a notch cut in the axle 21. Paper 1 is thus fed upward by the rolls 10 and 4 through the spaced openings between front and rear guide plates 12 and 7 of the platen, and is thereafter unsupported as it passes behind stylus 24 until it has passed behind ruler 26 which is located beyond the writing zone. Ruler 26 is made of transparent material so that messages can be read through it while being received, and is bolted to the frame 27 of the platen through spacers 28 to provide a slot therebetween which is disposed at an obtuse angle to the line of paper travel. It is by thus confining the paper to divergent paths on opposite sides of the writing zone and by causing it to be unsupported within the writing zone that the natural resilience of the paper is utilized to provide writing pressure against the stylus in a novel manner.

The stylus 24 travels in a fixed straight line path across the paper, and the pressure thereof against the paper 1 is adjusted to an optimum value by means of adjustment nuts 29. The pressure required is dependent upon the stiffness and width of the paper used, and upon the length of the stylus 24, which is subject to changes due to wear. Since it is usual, however, to adjust the stylus length at intervals during recording, by rotating into position the stylus adjustment gage 38 and its mounting bracket 39 about a pivot on shaft 3 against the tension of retracting spring 41, the adjustment nuts 29 need not be changed after once being set for a particular kind of paper.

Switch 36 is actuated by roller 57, when the paper roll 2 is depleted, and serves to operate a warning light under that condition. Switch 36 and its arrangement do not constitute a part of the present invention.

In Fig. 2 is shown a front view of the mechanism aforementioned, and in addition, the stylus skid 37 which is employed to guide the stylus 24 smoothly onto the surface of the recording paper.

It is hinged on screw 45 to swing freely into contact with the paper web 3 upon arrival of the moving stylus 24 of Fig. 1. Alternatively, a skid made of flat spring material rigidly secured at one end would be operative but has been found to require additional careful adjustment in order to avoid the introduction of transient mechanical vibrations to the paper. The skid can be eliminated entirely in low speed applications by arranging for the fixed path of the stylus members to approach the plane of the paper gradually as can be done, for example, by inclining the plane in which the stylus travels, at a small angle to the paper.

An eccentric 53 on the shaft 3 of handwheels 11 and 11' operates switch 44 to maintain the operation of motors 13 and 14 after termination of writing, thus providing feedout of paper for margin.

Fig. 3 is a cross-sectional view of the facsmile receiver shown in Figs. 1 and 2. A paper guiding plate 38 is shown secured to brackets 39 and 41 upon which the paper 1 is carried beneath the base 43 and between paper rolls 4 and 10.

A vane 23, made of light flexible material such as spring steel is secured in brackets 55 which are hinged on pivots (in Fig. 1) 56 so that uniform pressure from coil spring 51 fastened thereto is applied by vane 23 to the paper 1 behind the upper edge of plate 12. The posittion of vane 23 is variable by the motion of stop bar 31 sliding vertically through a perforation in fixed bracket 33, one end of spring 51 being affixed thereto and the lower end of stop bar 31 being retained in abutment with bracket 55. Height of the stop bar and consequent position of the vane 23 are adjustable upward by tightening screw 32 in self-locking fast nut 58, and downwardly by the pressure of spring 59 when screw 32 is loosened. By this means the effective length of the portion of paper which is unsupported by contact with the platen can be modified as needed to provide best operation of the recorder.

In Fig. 4 is shown a perspective view of one form of the platen, in which the front and rear guide plates 12 and 7 respectively are shown secured to the frame of the platen 27 to provide a paper guiding chute. A stylus guide 37 is retained by means of a shoulder screw 45 which passes through an insulating bushing within the sleeve 47 to which guide 37 is affixed by spot welding. Shoulder screw 45 is threaded into block 48 carried by the frame 27 of the platen. A strip of insulating plastic material 49 is affixed to the rear of stylus guide 37, which, together with insulating bushing 46 serve to isolate it electrically from the platen structure and from the recording paper 1, thus preventing short-circuiting of the stylus when in engagement with the guide, and also preventing marking of the paper by the stylus guide under that condition.

Fig. 5 is an enlarged cross-sectional view of the stylus guide assembly shown in Fig. 4, in which the shoulder screw 45 is seen to bottom on block 48 to permit free rotation of insulating bushing 46 thereupon. Sleeve 47, to which stylus guide 37 is welded, fits tightly around bushing 46 and is securely retained in position thereon by friction. The insulated assembly comprising stylus guide 37 is thus seen to be freely swingable about shoulder screw 45 without being subject to metallic contact therewith.

Fig. 6 is a cross-sectional view of a compact desk type facsimile recorder, in which further advantage is taken of the present invention to reduce the size and increase the convenience and reliability of the assembly. A case comprising a drawn steel lower portion 61 is provided with a handle 62, and is fastened by hinges 63 and 64 to upper case portions 65 and 66, which can thereby be swung upward to expose the interior mechanism. Case portion 66 has attached to it by means of screws 67 a bracket 68 on which screws 69 retain a pair of frame members 71. An idler feed roller 72 has its axle 73 supported in a slot 74 cut in each of the frame members, and is urged into contact with the paper 1 by springs 76 mounted thereon. A rear guide plate 77 is secured to the frame members 71 so that when upper case portion 66 is swung upward on hinge 64 the plate and all mechanism secured to bracket 68 is withdrawn from contact with the paper 1, so that paper roll 2 can be removed by retracting latches 78 against the pressure of springs 79 which revolves them around shoulder screw 81 and away from contact with stop pin 82 to free the axle 83 of the paper roll for lifting upward out of the bearing notches of inner frame 84. In placing a new roll of paper in the machine it is necessary only to lower it into position, since the angled heads 85 of the latches 78 are pushed aside by the axle 83, and snap into locking contact with the stop pin 82 when the roll falls in place, thus retaining it securely in position. By then withdrawing a portion of the paper 1 from the roll and closing upper case portion 66, the recorder is placed in condition for immediate operation, without the necessity for threading the paper through any of the mechanism, as is required when using other types of recorders.

A front guide plate 86 is permanently mounted by attachment to angle brackets 87 which are held to inner frame 84 by means of bolts 88. Paper 1 is urged upward between front and rear guide plates 86 and 77 by means of feed roll 89 mounted on shaft 91 which is driven by the spur gear 92 thereon. Gear 92 is driven by gear motor 93 through a spur gear 94 on its output shaft. Passing upward beyond rear guide plate 77, the paper is pressed forward by vane 95, hinged on shaft 96 in the frame members 71 and tensioned by spring 97 attached to the bracket 98 secured to the vane. Stop bar 99 into which is threaded adjustment screw 101 is depressed by spring 102 when the adjustment screw is released, to limit the forward travel of vane 95 at any desired distance. Paper 1 is thereby given an arcuate curve in passing across stylus 103, and the tension of the paper against the stylus is augmented by the lips 104 and 105 formed in upper case portions 65 and 66 respectively, through which the paper emerges.

Stylus 103 is one of three such styluses mounted by means of stylus holders 106 on a steel belt 107 that is stretched over two pulleys 108. A flat steel pressure plate 109 is held in place over the upper portion of belt 107 by means of a flat spring 110. The two pulleys 108 are mounted on shafts such as 111 which are journalled in frame casting 112 bolted to the lower portion 61 of the case. A slip clutch 113 and an indexing ratchet 114 are located on the shaft 111, the latter for engagement by armature 115 of relay 116. When energized by a synchronizing impulse received in connection with an incoming signal, relay 116 attracts this armature to disengage the ratchet and engage the clutch, thus permitting rotation of the shaft 111 by the worm wheel 117 attached to it, through the rotation of engaging worm 118 on the shaft of motor 119.

It is to be noted that by affixing front guide plate 86 to supporting structure independent of movable case portion 66, and affixing rear guide plate 77 to supporting structure secured only to the said portion, the said front and rear guide plates are separable by rotating case portion 66 about hinge 64. It is because of this construction that paper 1 can be inserted without any need for threading it through the platen thus rendering the replacement of the paper roll a simple and expeditious procedure which requires no technical skill.

This improved construction is made possible by the instant invention because the rear guide plate 77 and the front guide plate 86 occupy fixed and immovable positions in use, without having any of the conventional spring pressure exerted upon them. As a result of their dynamic independence, it is possible to remove and replace them bodily, by means of the hinged mounting above described, without hindrance from the interfering effects of bias springs, or difficulties due to the mechanical complexity implicit in adapting a floating platen to this service.

Although described as applied to a recording device at the receiving end of a signal circuit, the present invention is also applicable to transmitting mechanisms, as in the case where conductive marks made through the normally insulating surface of a conductive sheet are to be transmitted.

The instant invention as described is capable of providing stylus writing pressure in excess of six grams when used with commercially available recording paper. This is well within the operating range of 3–30 grams for such paper, and in fact, is desirably situated in the high contrast part of the range. Because of this low stylus pressure, it is possible to feed out message paper for headings and margins without making provision for retracting the stylus from paper contact as a precaution against leaving marks on the paper. Construction of the recorder is thus simplified.

It will be obvious that various modifications, alterations and elaborations of the devices shown in the drawings and described herein can be effected without departing from the spirit or the essential attributes of the invention as disclosed, and it is therefore intended that only such limitations be placed thereon as are specifically set forth in the appended claims.

What is claimed is:

1. In a facsimile recorder, the combination comprising rigidly mounted electric writing stylus means having a fixed and invariable scanning path, a movable sheet of resilient electrographic recording means urged into pressure contact therewith by unsupported arcuate flexion about a transverse axis parallel to said scanning path, an immovable substantially friction-free guiding and supporting means therefor fixedly retained in apposition to said sheet of recording means having an entering portion thereof disposed to guide said sheet of recording means in one fixed direction and having a portion thereof relieved from supporting contact in the region of said pressure contact and having a following portion thereof disposed to guide said sheet of recording means in another fixed direction, means for energizing the said stylus means, means for driving the said stylus means and means for moving the said sheet of recording means.

2. In a facsimile recorder, the combination set forth in claim 1 wherein the said movable sheet of resilient electrographic recording means comprises a chemically treated paper strip and the said guiding and supporting means comprises a smooth surfaced platen of rigid material and the said means for moving the said sheet of recording means comprises a motor and a paper contacting and advancing roller driven thereby for pushing said paper strip through said platen.

3. In a facsimile recorder, the combination set forth in claim 2 wherein the said platen is constructed of metal and wherein a vane hinged transverse to the said paper strip is adjustably spring-pressed against the rear thereof at a point within the said relieved portion of said platen, whereby the effective length of said relieved portion is rendered adjustable.

4. In a facsimile recorder for signal reception by automatic writing on a moving web of record paper in contact with rigidly mounted stylus means constrained to travel across a writing zone in a fixed transverse path, a substantially friction-free paper supporting platen having a prismatic surface transverse the web and fixedly located with respect to said path of said stylus means, relieved from paper contact within said writing zone and comprising paper guiding means disposed to project said record paper into impingement with said stylus means and terminal supporting means for said record paper whereby to flex paper into unsupported transverse cylindrical form and thereby to effect writing pressure contact against said stylus means solely by paper flexion.

5. In a facsimile recorder, the combination set forth in claim 4 wherein said paper guiding means comprises a chute formed by the surface of said platen in conjunction with a superposed parallel plate closely spaced and fixedly secured in relation thereto, enveloping the said web of record paper.

6. In a facsimile recorder constructed according to claim 5, a said paper supporting platen and a spring-pressed vane hingedly supported transverse to the said paper web and having an edge in adjustable pressure contact with said paper web at the rear thereof within the writing zone.

7. In a facsimile machine for scanning message medium, a platen immovably affixed to the machine comprising a rear plate of sheet metal bent on lines crossways to the direction of travel of said message medium to avoid contact therewith in the region of scanning, a superimposed spaced plate affixed thereto and defining a slippery paper chute, a transverse ruler spaced from the said rear plate at the end thereof opposite to the said paper chute, fixed in a plane intersecting the plane of the said paper chute at an obtuse dihedral angle and adapted conjointly with the said paper chute to confine said message medium to an unsupported arcuate path across said region of scanning to provide writing pressure solely by flexure thereof.

8. In a facsimile recorder comprising a front portion and a rear portion which are adapted by movable fastenings to be manually separated for the insertion of a record sheet to slide freely therebetween, the combination which comprises rigidly mounted stylus means having a transverse scanning path, a record sheet for advancement beneath the said stylus means, immovable paper guiding and supporting means affixed to the said rear portion in apposition to the said record sheet comprising a stylus preceding part having one direction of paper advance and a stylus following part having having another direction of paper advance the said directions intersecting convexly to the said stylus means and having a portion thereof relieved from paper contact in the region of said scanning path, and corresponding complementary parts of paper guiding means attached to the said front portion in apposition to the said record sheet, whereby insertion of said record sheet between said guiding and supporting means and said complementary paper guiding means can be accomplished by separation of said front and rear portions, manually advancing said record sheet, and replacing said guiding and supporting means and said complementary paper guiding means thereby flexing said record sheet in an unsupported arc impinging upon said stylus means for generating a writing pressure independent of stylus motion.

References Cited in the file of this patent

UNITED STATES PATENTS

| | | |
|---|---|---|
| 2,278,919 | Erickson et al. | Apr. 7 1942 |
| 2,384,515 | Wise | Sept. 11, 1945 |
| 2,593,068 | Stamper | Apr. 15, 1952 |
| 2,639,211 | Hallden et al. | May 19, 1953 |

FOREIGN PATENTS

| | | |
|---|---|---|
| 460,272 | Great Britain | July 22, 1937 |